Aug. 5, 1969     W. D. CORNELL     3,459,424
PIN DETECTION SYSTEM
Filed May 21, 1965     3 Sheets-Sheet 1
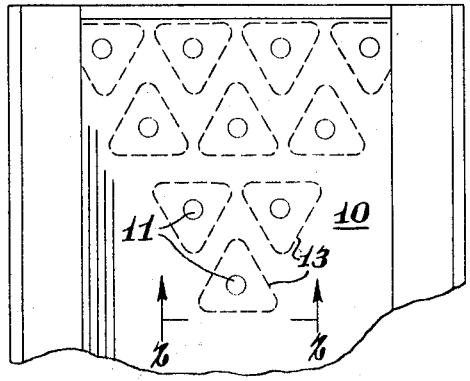
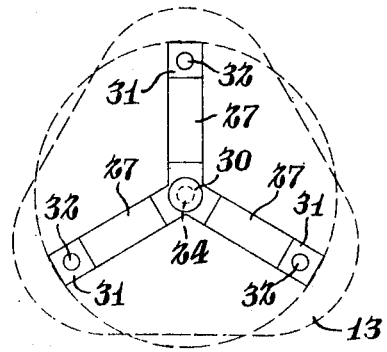
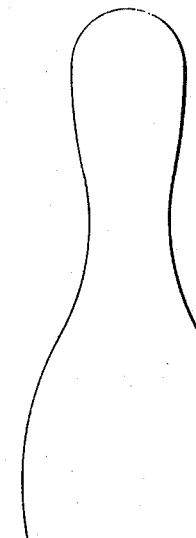
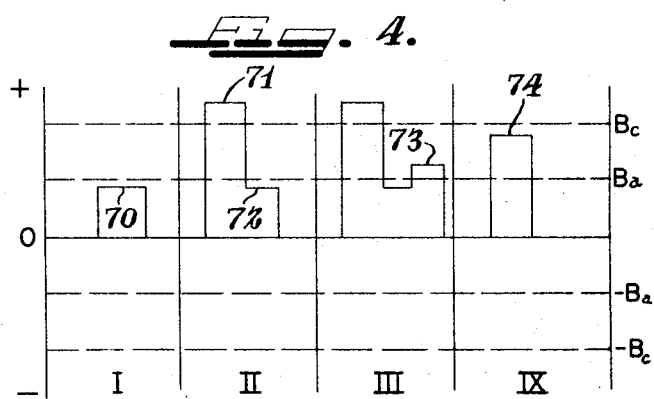
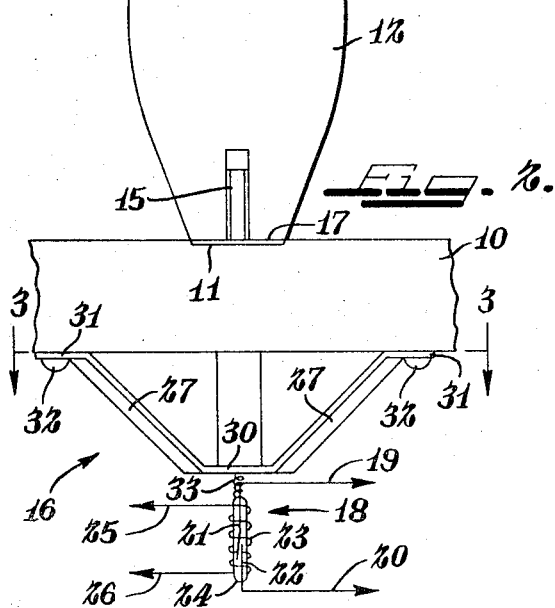
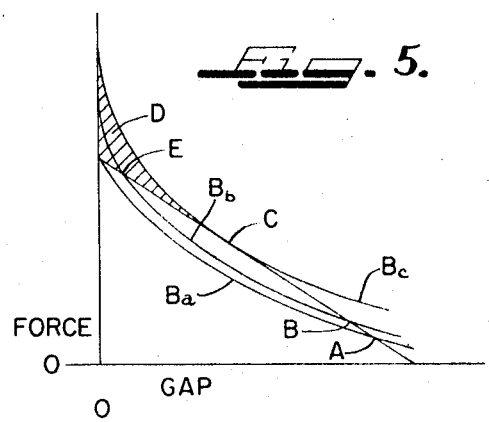
INVENTOR
WILLIAM D. CORNELL
BY
Hofgren, Wegner,
Allen, Stellman & McCord
Attys.

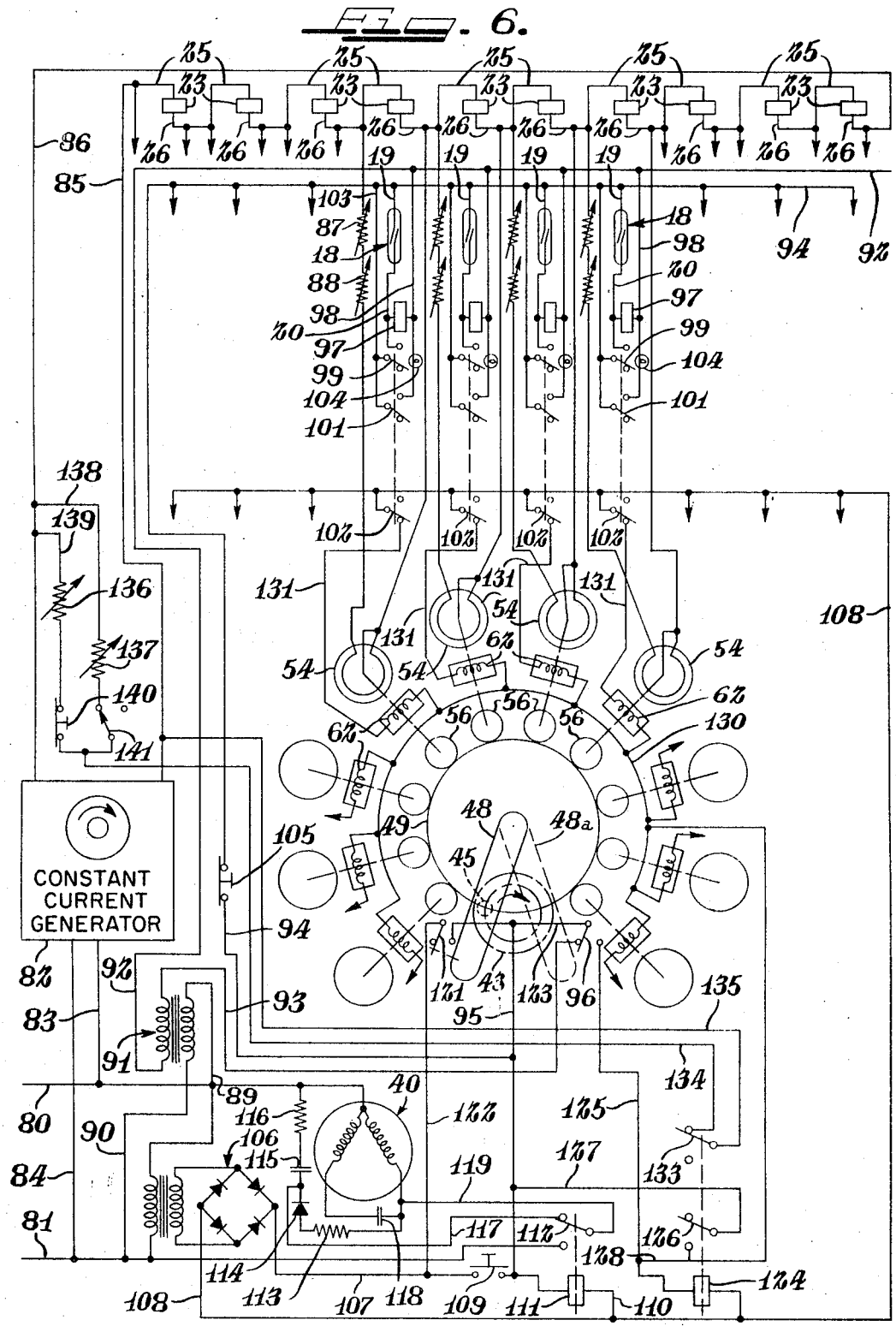

United States Patent Office 3,459,424
Patented Aug. 5, 1969

3,459,424
PIN DETECTION SYSTEM
William D. Cornell, Grand Haven, Mich., assignor to
Brunswick Corporation, a corporation of Delaware
Filed May 21, 1965, Ser. No. 457,618
Int. Cl. A63d 5/06
U.S. Cl. 273—52
24 Claims

ABSTRACT OF THE DISCLOSURE

A system for automatically calibrating a pinfall detecting device wherein a magnetically biased reed switch indicates the presence or absence of a pin on a pin spot, said calibrating system including means for setting the reed switch to close within the range of a variable resistor connected in circuit with the reed switch biasing means, means for driving the variable resistor through its range of adjustment, and means for interrupting the driving means in response to the closing of the reed switch to leave the reed switch in a predetermined state of sensitivity.

---

The present invention relates in general to means for calibrating a pinfall detection device, and more particularly to a means for automatically calibrating a biased reed switch pinfall detecting device.

In the bowling pin detection art it has been proposed to provide a detectable member in a bowling pin, and a detection means beneath the alley for detecting the presence or absence of the pin. In one form of pin detection means, it has been proposed to provide bowling pins with vertically positioned magnets at the lower end of the pins, with reed type switches for each pin being connected in an appropriate circuit to an indicating device, and being responsive to the magnet in the bottom of the respective pin to indicate the presence or absence of the pin. It has also been proposed to provide the aforedescribed reed switch type of pin detection systems with means for magnetically biasing the red switch to increase its sensitivity, and with additional means for extending the area within which pins may be detected. Such apparatus is typified by that disclosed in the co-pending application of Donald F. Uecker, Ser. No. 199,034, filed May 31, 1962, entitled "Pinfall Detection Means," now Patent No. 3,223,414. In devices such as the biased reed switch pin detection device disclosed in the above-mentioned Uecker application, it has been found that the system requires periodic balancing due to the inherent instability of the components. It has been discovered that such systems require rebalancing as often as every hour or less to retain the proper sensitivity to the presence or absence of a pin. Accordingly, the general purpose of the present invention is to provide a method and apparatus for automatically balancing the pin sensitivity of such pin detection apparatus.

Thus, a principal object of the invention is to provide a pin detection device with means whereby the detection device will produce uniform detecting results.

An object of the invention is to provide a system for automatically rebalancing the pin sensitivity of biased reed switch pin detection means that is automatic in operation, and may be set to operate at fixed time periods, as for example every thirty minutes.

Another object of the invention is to provide an automatic rebalancing system for a pin detection means which will control the sensitivity of the pin detection means, so that the pin detection means will operate faithfully during the time periods between rebalancing and thus render error-free service.

A further object of the invention is to provide a calibration system for automatically balancing biased reed switch type of pin detection apparatus which is simple in construction, efficient in operation, well adapted for its intended purposes, and relatively inexpensive to manufacture and maintain.

Still another object of the invention is to provide a method for balancing the pin sensitivity of pin detection apparatus as described above.

A still further object of the invention is to provide a pin detection system wherein pin detection means beneath an alley detect a detectable member carried by a pin, and wherein the detection means includes means for varying the sensitivity thereof so that the detection means can be adjusted to a desired level.

Other objects and advantages will become readily apparent from the following detailed description, taken in connection with the accompanying drawings, in which:

FIG. 1 is a fragmentary plan view of the pin supporting portion of a bowling lane bed with a preferred form of the invention installed thereon;

FIG. 2 is an enlarged fragmentary vertical view along line 2—2 of FIG. 1, showing a preferred form of the invention;

FIG. 3 is a horizontal view along line 3—3 of FIG. 2;

FIGS. 4 and 5 are graphs;

FIG. 6 is a wiring diagram showing the automatic calibration means and a portion of a detecting system;

Figure 8:
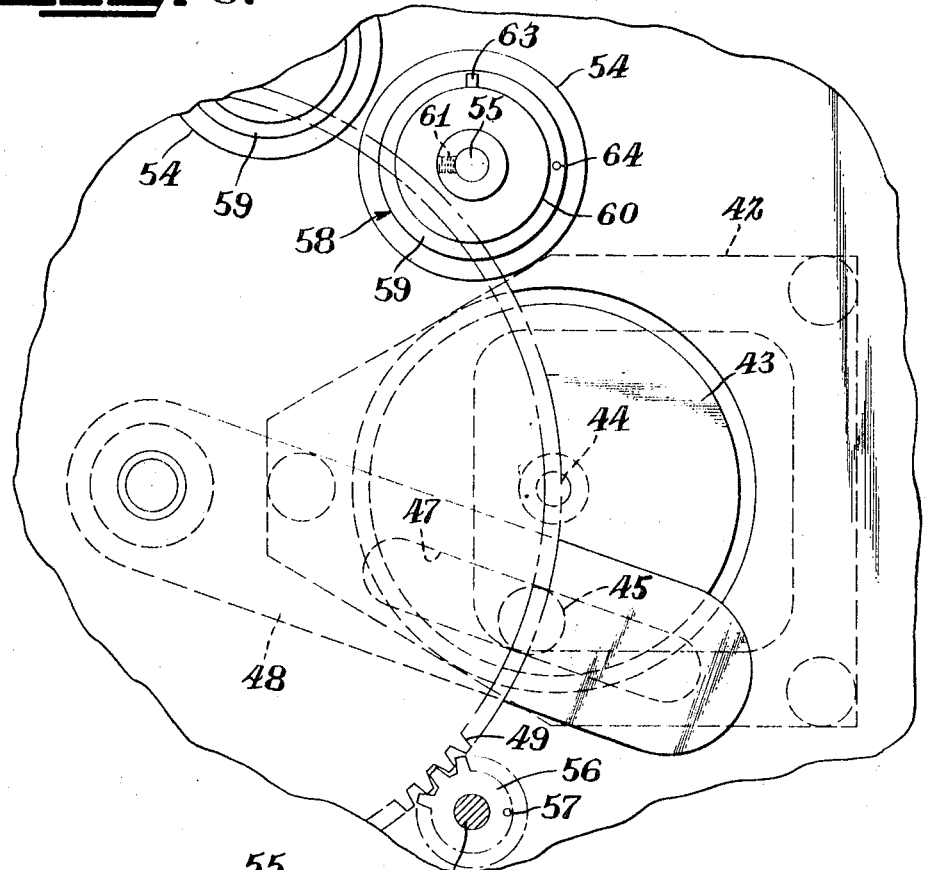
FIG. 8 is an enlarged plan view of a portion of the calibrating means shown in FIG. 7.

While there is illustrated and described herein a preferred form of the invention, it is shown with the understanding that it is for the purpose of disclosing the principles of the invention and is not to limit the invention to the particular form. The scope of the invention will be pointed out in the appended claims.

As shown in the drawings, 10 represents the pin supporting end of the bed of a bowling lane, and has the customary ten pin spots 11 for locating pins 12 as shown in FIG. 2. The somewhat triangular areas 13 indicate approximately the areas in which standing pins will be detected by the form of the invention illustrated in FIGS. 1 to 3.

The invention is directed to a system for detecting and indicating the presence or absence of pins in the ten areas 13 adjacent the ten pin spots 11 when the pins are provided with magnets 15, and detecting devices 16 under the pin spots 11 are sensitive to the magnet 15 in a standing pin 12 but not to a fallen pin or the absence of a pin. The bowling pin 12 is shown with an axially positioned cylindrical bar magnet 15 having its lower end approximately flush with the pin base 17.

In FIGS. 1 to 3 the detecting device 16 is shown as comprising a reed switch 18 positioned below and coaxially of the pin spot 11. Leads 19 and 20 connect with the reed switch contacts 21 and 22 respectively, and a biasing coil 23 surrounding the envelope 24 of the switch has leads 25 and 26 at its ends. The arrangement of such switches in a circuit will be described hereinafter.

In order to extend the sensitive area of the detecting device, the invention contemplates the provision of a magnetically conductive means or structure intermediate the switch 18 and the pin spot 11. In FIGS. 2 and 3 such means is in the form of a spider having iron pole pieces or members 27 extending upwardly and outwardly from an integrally formed central plate 30 located immediately above the upper end of the switch and below an associated pin spot. The upper ends of the pole pieces are provided with integral horizontal portions 31 to facilitate attachment to the underside of the bed 10 by screws 32. A detecting device of this form is sensitive to pins standing within a substantial area around a pin spot, as for example the triangular area 13 in FIG. 3, when the magnet 15 in the pin is positioned vertically therein and with its lower end exposed, and the associated reed switch 18 is located coaxially of the pin spot and provided with a biasing coil.

Considering a two-pole magnet such as 15, of length L, the magnetic field is most intense between the poles along the magnetic axis, but if the magnet were inserted completely into a bowling pin, such field might be inaccessible for detection purposes. The field strength diminishes generally at all points more remote, but that field lying generally outside the ends of the magnet diminishes more slowly than that transverse to the magnetic axis, and at a distance from the magnet greater than L the endwise field is the stronger, being twice as strong at distances much greater than L.

It follows that a preferred magnet embodiment consists of a cylindrical bar magnet whose magnetic axis coincides with the longitudinal pin axis and one of whose ends is flush or nearly so with the pin base. With this arrangement, the field generally downward from a standing pin is as intense as possible and that from a lying pin is relatively weaker and at right angles. Also, there are no azimuth effects resulting from turning a standing pin on its longitudinal axis, as might happen after several settings by the usual pinsetter machine.

It is preferable to use Alnico V for the magnetic material in the pin as it is among the most energetic materials available. Its magnetic characteristics require that, for its most efficient functioning, its length be about four times its diameter. It has been found that such a magnet ⅜″ in diameter by 1½″ long in a tenpin is adequate to operate the detection system, and that this size can be accommodated in the hole in a pin base as customarily supplied by the trade, without additional machining and at low cost.

Other magnetic materials might also be used provided the material can be conveniently fitted into the pin and will produce sufficient energy.

A reed switch such as 18 consists generally of two thin, permeable, conductive reeds 21 and 22 whose adjacent ends overlap in the longitudinal direction with a slight gap in the transverse direction. The outer reed ends connect into an electric circuit, for which the gap constitutes a normally open circuit. Such constructions are commercially available, and are attractive because of their low cost, freedom from pivot joints, and their hermetically sealed, inert gas atmosphere for contact protection. They are, therefore, a preferred construction although functionally similar constructions might also be used.

If such a switch is placed in a magnetic field with its longitudinal axis more or less in the direction of the field, the relatively high permeability of the reeds causes a local increase in field strength and the appearance of magnetic poles at the cantilevered ends of the reeds. The magnetic poles cause the reed ends to be attracted to each other, as is well known, with a force that increases rapidly as the gap is closed. At some field strength the magnetic attraction is sufficient to overcome the stiffness of the reeds and the gap closes rapidly and completely. These relations are depicted in FIG. 5. The magnetic forces resulting from three different intensities of magnetic field are shown as curved lines Ba, Bb, and Bc. In the case of the low field intensity Ba, the magnetic force can deflect the reeds only to point A, short of closure. At an intermediate field of strength Bb, the reeds would partially close to point B. At a particular higher field intensity Bc, the magnetic curve would become tangent to the spring constant line at C and the gap would close completely with surplus energy as shown by the area D and a residual force producing contact pressure. As the fields were reduced, the contacts would remain closed, as at E, until no excess force or energy were available, at which time the contacts would spring apart again. This snap action is highly desirable to prevent contact burning and to provide shock and vibration resistance. It can be made as slight or pronounced as desired by varying the stiffness of the reeds and the magnetic proportions.

These relations lead to the conditions shown in FIG. 4 for a particular switch. Line Bc indicates the field strength required to close the switch, i.e., the upper line of FIG. 5. Ba indicates the drop out field, i.e., the lower line of FIG. 5. By providing a bias field associated with the subdeck equipment, the switch can be put in the intermediate condition B of FIG. 5 before the flux from the pin is applied. By adding sufficient bias field to move point B very close to point C, only a slight incremental field from the pin is required to operate the reed switch. The reed switches are insensitive to field polarity and would operate as well at —Bc and —Ba, but if the pin magnets are all inserted with a given polarity, only one direction need be considered.

Generally, it is not desirable that the detection system be equally sensitive at all times. The mechanical shock and vibration of pinfall suggest that the detection system be activated after each ball is thrown only after the pins have assumed essentially reset position, and the fact that the pin-setter may subsequently re-spot or sweep the standing pins suggests that the results of the interrogation be stored in a memory such as a bank of holding relays.

Four different bias examples are indicated in FIG. 4. In Example I, a bias 70 slightly less than Ba is applied, with the result that the operating pin field is reduced from Bc to little more than Bc—Ba. In Example II, the switch is closed by a bias pulse 71 greater than Bc, subsequently the bias is reduced to 72 just under Ba, and only if a standing pin contributes a field to equal Ba will the switch remain closed. This approach has the shortcoming that during the second interval the switch has little surplus energy and may be of high resistance. Accordingly, in Example III the bias 73 is increased to a value between Bc and Ba for readout. My preferred method is shown in Example IV, in which the bias pulse 74 approaches Bc. It has the advantage of requiring no more pin field than in Examples II or III, results in low resistance, vibration-resistant contact, and can be completed in a shorter interval with simpler bias switch gear.

The above assumes that the bias field and the pin magnet field are cooperative in their effect on the reed switch; although there is no operational advantage to be gained; the polarity of the bias field might be chosen to oppose the pin magnet field and increased so as to be slightly greater than Bc or Ba as the case may be. In such case, closure of the reed switch would signify a fallen pin and vice versa.

With a ⅜ x 1½ Alnico V magnet, the reed switch mounted vertically with its upper tip about 5″ below the playing surface, and bias conditions as in Example IV above, it is possible to detect a standing pin over about a generally circular area of 3½″ radius. The sensitive area is preferably extended by using a magnetic means extending from the region of the switch toward the playing surface. In the embodiment as shown in FIGS. 2 and 3, and with the bias adjusted so that a fallen pin does not close the switch, a sensitive area about as shown at 13, with a 6″ extreme radius has been obtained. The 5″ radius of the pole pieces, circularly arranged as represented at 75, the 5″ depth of the switch below playing surface, and the number, exact angle, or cross sectional area of the pole pieces are not critical.

Preferably, the switch and its associated bias coil are supported from the spider plate 30 by a coil spring 33 for convenience as well as its vibration isolation action.

The means for calibrating the abovedescribed pin detection means include a motor 40 which is mounted in a housing 41 by a suitable bracket 42. An output member in the form of a gear, wheel or the like is fixed on the output shaft 44 of the motor 40, and a suitable eccentric member 45 is mounted on the output member 43 by a pin 46.

Eccentric 45 is slidable in a longitudinally extending slot 47 formed in the undersurface of a crank arm 48. A sun gear 49 is rotatably mounted on a shaft 50, that is fixed to housing 41, and sun gear 49 includes a downwardly extending hub 51 to which crank arm 48 is fixably secured. As can be best seen in FIG. 6, when motor 40 is energized, motor shaft 44 and output member 43 rotate continuously in a clockwise direction, as shown by the directional arrow in FIG. 6, and the eccentric pin 45 traverses back and forth in the groove 47 to oscillate the crank arm 48 and the sun gear 49.

Figure 7:
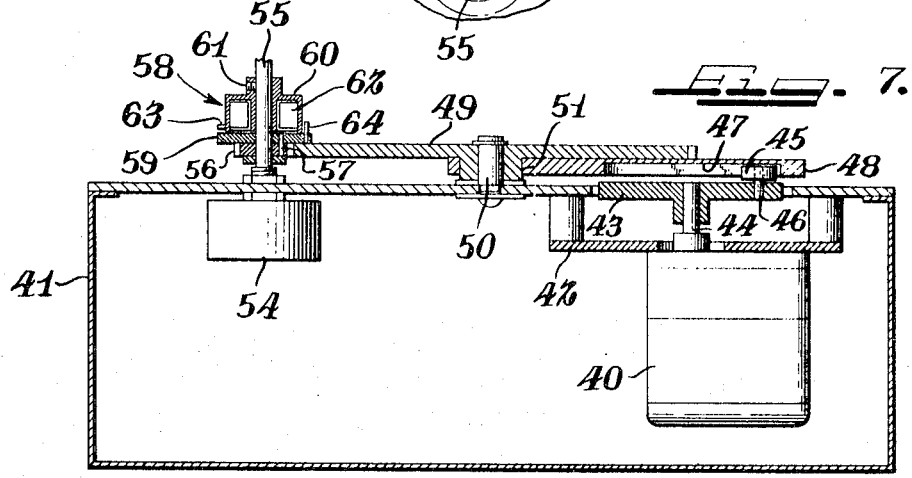
FIG. 7 is a sectional view taken generally centrally through a portion of the calibrating means with certain parts having been omitted for purposes of clarity.

Ten potentiometers 54, one for each pin spot, are fixed to the cover of housing 41, and each potentiometer 54 includes an upwardly extending shaft 55. A planet gear 56 is rotatably mounted on each potentiometer shaft 55, and a clutch armature 59 of a magnetic clutch 58 is mounted for rotation with each planet gear 56 by a vertically extending pin 57. As can be best seen in FIGS. 7 and 8, the planet gears 56 mesh with the sun gear 49, so that the oscillating movement of the sun gear 49 will be imparted to the planet gears 56 and their respective clutch armatures 59. Each magnetic clutch 58 includes a clutch housing 60 which is fixed on the output shaft 55 of the respective potentiometer as by a set screw 61 or the like. Each magnetic clutch 58 includes a suitable coil 62 held in housing 60, and adapted to attract the respective clutch armature 59 when an appropriate direct current is passed through the coil 62. Thus, when the magnetic clutches 58 are energized, the planet gears 56, clutch armatures 59, clutch housings 60 and potentiometer shafts 55 oscillate together with the sun gear 49. However, when the clutches 58 are not energized, the planet gears 56 and the clutch armatures 59 are free to rotate independently of the clutch housings 60 and the potentiometer shafts 55.

A radial pin 63 extends outwardly from the lower portion of each housing 60 (FIGS. 7 and 8), while an axial pin 64 extends vertically upward adjacent the periphery of each clutch armature 59. Pin 64 extend vertically upward a sufficient amount so as to contact the radial pins 63 on the respective clutch armatures 59 when the clutch armatures 59 are rotated relative to the housing 60, and as will hereinafter be more fully explained, this enables the sun gear 49 to rotate the potentiometer shafts 55 to a point of minimum resistance, when the magnetic clutches 58 are not actuated.

Turning now to the fragmentary wiring diagram shown in FIG. 6, ten biasing coils 23 are shown at the upper portion of FIG. 6, however, only four reed switches 18 have been shown for simplicity and clarity of illustration. It will be understood, of course, that while the coils 23 have been illustrated in FIG. 6 as being spaced from the reed switches 18, in actuality the coils 23 surround the respective envelopes 24 of the reed switches 18, as is taught in the aforementioned Uecker application and as shown in FIG. 2. The biasing coils 23 are shown spaced from the reed switches 18 in FIG. 6 for purposes of clarity in the wiring diagram. Lines 80 and 81 represent a source of 110 volt AC current, and a constant current generator 82 is connected across lines 80 and 81 by lines 83 and 84. Output lines 85 and 86 extend from constant current generator 82, and each of the biasing coils 23 is connected in series with line 85 by their respective leads 25 and 26. To compensate for variation in sensitivity of the reed switches, each coil 23 is shunted by a plurality of serially connected potentiometers 87, 88 and 54. Potentiometers 87 and 88 are, respectively, coarse and fine manual adjustments while the aforedescribed potentiometer 54 is motorized. In an exemplary embodiment, potentiometer 87 may have a maximum resistance of 10 ohms, while potentiometer 88 may have a maximum resistance of 3 ohms and potentiometer 54 a maximum resistance of one ohm. It should be understood, of course, that the aforedescribed values and the component values to be mentioned hereinafter are for purposes of illustration only, and are not meant in any way to limit the invention to the specific values mentioned. It will also be understood that each of the pin spots will have circuitry which is identical with the circuitry to be described in connection with pin spots 4–7, and that the circuitry is described in connection with four pin spots only for purposes of simplicity of illustration.

A step down transformer 91 is connected across lines 80 and 81 by lines 89 and 90, and transformer 91 steps the 110 volt AC voltage to 24 volts AC in the exemplary embodiment. One side of the secondary winding of transformer 91 is connected in a line 92, and the other side of the secondary winding of transformer 91 is connected to a line 93 which extends to a normally closed limit switch means 96 to be hereafter described. A line 94 is connected with the limit switch means 96 by a line 95, and each of the reed switches 18 are connected to line 94 by their respective leads 19. A relay 97 is associated with each reed switch 18, and one end of each relay coil is connected to the lead 20 of the respective reed switch 18, while the other side of the relay coil is connected to a line 98 which is connected with line 92. A plurality of switches 99, 101 and 102 are controlled by each relay 97, and switches 99 and 101 are normally open while switch 102 is normally closed. Thus, when a relay 97 is actuated as by the presence of a pin on a pin spot, switch 99 closes to complete a holding circuit for the relay 97 via a line 103, and line 98. The closing of switch 101 completes a circuit to a lamp 104 to indicate the presence of the respective pin. When the relay 97 is actuated, switch 102 opens to break the circuit to the respective clutch coil 62, for a purpose to hereafter appear. A manual cancel switch 105 is provided in line 94 to cancel any previous pin indications when desired.

A full wave rectifier 106 is connected across lines 80 and 81 and has an output of 30 volts DC across lines 107 and 108. A normally open, manually operable, automatic calibrate button 109 is provided in line 107 for purposes of manual initiation of a rebalancing sequence. A line 110 interconnects lines 107 and 108, and a relay 111 is provided in line 110. A switch 112 is operated by relay 111 and is movable between contacts associated with lines 81 and 117. Thus, when button 109 is depressed, relay 111 is energized and switch 112 moves into electrical connection with line 81 to complete a circuit for initiation of operation of motor 40. A capacitor 118 is provided in association with motor 40 to shift the phase in one winding of motor 40 to insure proper starting of the motor. An appropriate braking circuit for the motor 40 is connected between line 119 and line 80 and includes a resistor 113, a diode 114, a capacitor 115, and a resistor 116. In an exemplary embodiment resistor 113 has a value of 100 ohms, capacitor 115 has a value of 80 microfarads, and resistor 116 has a value of 27 ohms.

Prior to the actuation of motor 40, a first limit switch 121 is held in the open position shown in FIG. 6 by arm 48. Limit switch 121 opens and closes a circuit between a line 122 which is connected to line 107, and line 123 which extends to second limit switch 96. When motor 40 is actuated and shaft 44 begins to rotate in a clockwise direction to pivot arm 48 in a counterclockwise direction, switch 121 is closed and a holding circuit is completed to relay 111 via line 107, line 122, switch 121, line 123, line 95, and line 108.

When the motor shaft 44 has completed approximately 160° rotation, to position the arm 48, as shown in broken lines at 48a in FIG. 6, limit switch 96 will be closed to complete a circuit to a second relay 124 via lines 107, 122, switch 121, line 123, switch 96, line 125 and line 108. A switch 126 is associated with relay 124, and closes when relay 124 is energized to complete a holding circuit to relay 124 via lines 107, 122, 123, 95, 127, 128 and 108. When relay 124 is energized, the closing of switch 126 also applies 30 volt DC power to the magnetic clutches via line 107, line 122, switch 121, line 95, line 127, switch 126, line 128, and line 130; and the circuit is completed from the magnetic clutches through coils 62, lines 131, switches 102, and line 108. A second switch 133 is operated by relay 124 and opens and closes a circuit which shunts a pair of potentiometers 136 and 137 across the bias coils 23.

In this respect, a line 135 is connected to line 85, and a line 134 is connected to a branch including lines 138 and 139 which are connected to line 86. Normally closed interrogate switch 140 is provided in line 139, and may be either manually operated, as shown, or operated via a timer mechanism (not shown) tied to the pinsetter cycle, to provide a delay, as for example three seconds, to remove the potentiometer 136 from its shunting condition across coils 23 to register standing pins. A calibrate switch 141 is provided in line 138 to defeat the shunt path of potentiometer 137 and provide for manual adjustment of potentiometers 87 and 88. In an exemplary embodiment, potentiometer 136 has a maximum resistance of 6 ohms, while potentiometer 137 has a maximum resistance of 2,000 ohms. Potentiometer 137 is adjusted so that when it is shunted across the coils 23, the amount of current flowing to the coils 23 is insufficient to operate the respective reed switches 18 in the absence of a pin magnet. Potentiometer 136 is preadjusted to a setting such that when both potentiometers 136 and 137 are shunted across the coils 23, the amount of current flowing to the coils 123 is insufficient to close the respective reed switches 18 even during the intense vibration caused by pin fall.

Operation

When it is necessary or desirable to rebalance the sensitivity of the reed switches 18, as when the sensitivity of the reed switches has drifted due to their inherent instability, or after a fixed time period during a programmed cycle, certain of the reed switches 18 will require more and some will require less shunting than that provided during the previous setting of the potentiometers 54. At a time when the pin deck is clear of pins, if automatic calibrate button 109 is manually depressed, or automatically depressed by timer means (not shown) after a fixed lapse of time during a programmed cycle, relay 111 would be energized, and a circuit will be completed to motor 40 by the closing of switch 112. As the motor shaft 44 and the output member 43 begin to rotate in a clockwise direction, arm 48 will be pivoted in a counterclockwise direction by eccentric 45 to close switch 121. When switch 121 closes, a holding circuit is completed to relay 111 to keep power applied to the motor 40. Since switch 96 is open, the magnetic clutches 58 are not energized, since no current flows to the coils 62. Thus, as arm 48 rotates, sun gear 49 rotates the planet gears 56, and the axial pins 64 on the clutch armatures 59 engage the radial pins 63 on the clutch housing 60 to rotate the potentiometer shafts 55 and place the potentiometers 54 in a position of lowest resistance.

When arm 48 moves into the broken line position shown at 48a in FIG. 6, switch 96 is closed and this breaks the circuit from the transformer 91 to the holding contacts 99 and 101 of the relays 97 to cancel any previous pin indications on lamps 104. The closing of switch 96 also completes a circuit to relay 124 so that the DC output across lines 107 and 108 will be applied to the coils 62 of the magnetic clutches 58. When switch 96 closes to energize relay 124, switch 133 is closed to remove potentiometers 136 and 137 from their master shunting condition across the series string of bias coils 23. It is assumed that the current generator 82 and the potentiometers 87 and 88 have been previously set so that the reed switches 18 will close without additional flux from the standing pin magnets 15 somewhere within the control action of the potentiometers 54.

As motor shaft 44 continues to rotate and arm 48 begins to move away from the broken line position, shown in FIG. 6, all of the potentiometers 54 will be turned simultaneously in the direction of increasing resistance due to the action of magnetic clutches 58. The increasing resistance of potentiometers 54 decreases the amount of current shunted around the bias coil 23, thereby increasing the sensitivity of the individual pin spots. As the sensitivity of each pin spot increases, its respective reed switches will close somewhere within the range of resistance of its respective potentiometer 54. When the reed switches 18 close, the respective relays 97 are energized to operate switches 99, 101 and 102. The opening of switch 102 breaks the circuit to the coils 62 of the magnetic clutches 58, so that continued rotation of sun gear 49 will rotate the planet gears 56 independently of the potentiometer shafts 55. Thus, each pin spot would be left in a precise condition of sensitivity so that their respective reed switches 18 would operate without the assistance of pin magnet flux.

When arm 48 returns to the solid line position shown in FIG. 6, it closes the switch 121 to interrupt the holding circuits to relays 111 and 124. When relay 124 is deenergized, potentiometers 136 and 137 are again placed in parallel with the series string of bias coils 23. This decreases the amount of current flowing through the bias coils by an amount such that each of the reed switches 18 requires a pin magnet 15 to operate the respective reed switches. Thus, each of the pin spots is in a precisely balanced condition and will faithfully indicate the presence or absence of pins without error. When arm 48 opens switch 121 to deenergize relay 111, a heavy pulse of direct current energy stored in the capacitor 115 is applied to one winding of the motor 40 to stop the motor and complete the calibration cycle.

From the foregoing, it should be apparent that the present invention satisfactorily fulfills each of the objects of the invention.

I claim:

1. The method of balancing bowling pin detection apparatus having a biased, magnetically actuated reed switch positioned beneath each pin spot on a bowling alley connected in circuit with a pin indicator, and each reed switch being adapted to be operated by a bowling pin having a permanent magnet, comprising the steps of: (1) applying a fixed current to the reed switch biasing means; (2) setting each of said reed switches to close within the range of adjustment of a variable resistor connected with each of said biasing means; (3) simultaneously driving each of said variable resistors through their respective range of adjustment to close the respective reed switches; and (4) interrupting the drive to each variable resistor simultaneously with the closing of its respective reed switch to leave each of the reed switches in a predetermined state of sensitivity.

2. The method of automatically balancing bowling pin detection apparatus having a biased, magnetically actuated reed switch positioned beneath a pin spot connected in circuit with a pin indicator, and adapted to be operated by a bowling pin having a permanent magnet, comprising the steps of: (1) applying a current to the reed switch biasing means; (2) setting said reed switch to close within the range of adjustment of a variable resistance connected with said biasing means; (3) driving said variable resistor through its range of adjustment to close the reed switch; and (4) interrupting the drive to the variable resistor in response to the closing of the reed switch to leave the reed switch in a predetermined state of sensitivity.

3. The method of automatically calibrating bowling pin detection apparatus having a biased, magnetically actuated reed switch positioned beneath each pin spot on a bowling alley connected in circuit with a pin indicator, and each reed switch being adapted to be operated by a bowling pin having a permanent magnet, comprising the steps of: (1) applying a current to the reed switch biasing means; (2) setting each of said reed switches to close within the range of adjustment of a variable resistor connected in parallel with each of said biasing means; (3) driving each of said variable resistors through their respective range of adjustment to close the respective reed switches; and (4) interrupting the drive to each variable resistor in response to the closing of its respective reed switch to leave each of the reed switches in a predetermined state of sensitivity.

4. The method of automatically calibrating bowling pin detection apparatus having a biased, magnetically actuated reed switch postioned beneath each pin spot on a bowling alley connected in circuit with a pin indicator, and each reed switch being adapted to be operated by a bowling pin having a permanent magnet, comprising the steps of: (1) applying a fixed current to the reed switch biasing means; (2) setting each of said reed switches to close within the range of adjustment of a variable resistor connected in parallel with each of said biasing means; (3) simultaneously driving each of said variable resistors through their respective range of adjustment to close the respective reed switches; (4) interrupting the drive to each variable resistor simultaneously with the closing of its respective reed switch to leave each of the reed switches in a predetermined state of sensitivity; and (5) connecting resistance means in parallel with said biasing means to reduce the current flowing through said biasing means to a level where the reed switches will be closed only when a bowling pin is present on the respective pin spots.

5. The method of automatically calibrating bowling pin detection apparatus having a biased, magnetically actuated reed switch positioned beneath each pin spot on a bowling alley connected in circuit with a pin indicator, and each reed switch being adapted to be operated by a bowling pin having a permanent magnet, comprising the steps of: (1) applying a fixed current to the reed switch biasing means; (2) setting each of said reed switches to close within the range of adjustment of a variable resistor connected in parallel with each of said biasing means; (3) driving each of said variable resistors to a position of minimum resistance and minimum pin spot sensitivity; (4) driving each of said variable resistors through their respective range of adjustment toward a position of maximum resistance and maximum pin spot sensitivity to close the reed switches; (5) interrupting the drive to each variable resistor in response to the closing of its respective reed switch to leave each of the reed switches in a predetermined state of sensitivity; and (6) connecting resistance means in parallel with said biasing means to reduce the current flowing through said biasing means to a level where the reed switches will be closed only when a bowling pin is present on the respective pin spots.

6. In a pin detector for detecting the presence or absence of bowling pins containing a permanent magnet, said pin detector including a magnetically actuated reed switch located beneath each bowling alley pin spot with means forming a magnetic bias on said switches; a device for balancing the reed switches, comprising: a source of current for said biasing means; a first resistance connected in parallel with said biasing means to limit the current flowing therethrough and to prevent the actuation of the switch in the absence of a pin; means for disconnecting said first resistance from said biasing means; first variable resistance means connected in parallel with each of said biasing means for manual control of the current flowing through said biasing means and adapted to be preset so as to render said reed switch capable of closing within a fixed range of current flowing through said biasing means in the absence of a pin and when said first resistance is disconnected; second variable resistance means connected in parallel with each of said biasing means and having a range of adjustment adapted to control said range of current; means for driving each of said second variable resistance means through its respective range of adjustment; means responsive to the attainment of the closing value of each of said reed switches for interrupting the drive to its respective second variable resistance means to leave each of said reed switches in a predetermined state of sensitivity; and means for reconnecting said first resistance in parallel with said biasing means so that said reed switches will close only when a pin is present on the respective pin spots.

7. In a pin detector for detecting the presence or absence of a bowling pin containing a permanent magnet, said pin detector including a magnetically actuated reed switch located beneath each bowling alley pin spot with means forming a magnetic bias on said switches; a device for balancing the reed switches, comprising: a source of current for said biasing means; a first resistance connected in parallel with said biasing means to limit the current flowing therethrough and to prevent the actuation of the switch in the absence of a pin; means for disconnecting said first resistance from said biasing means; variable resistance means connected in parallel with each of said biasing means, and each variable resistance means having a range of adjustment within which the respective reed switches are closed in the absence of a pin and when said first resistance is disconnected; means for driving each of said variable resistance means through its respective range of adjustment; means responsive to the attainment of the closing value of each of said reed switches for interrupting the drive to its respective variable resistance means to leave each of said reed switches in a predetermined state of sensitivity; and means for reconnecting said fixed resistance in parallel with said biasing means so that said reed switch will close only when a pin is present on the respective pin spot.

8. A pin detector for a bowling pin containing a detectable member therein comprising: an indicating device for indicating the presence or absence of a bowling pin on a bowling alley pin spot; a switch beneath said bowling alley pin spot and connected in a circuit with said indicating device; means for producing a bias on said switch so that said switch will be actuated at a preselected current flow through said biasing means and when a pin is present on said pin spot; means for adjusting the amount of current flowing through said biasing means to thereby vary the magnitude of the force of said biasing means, whereby the sensitivity of said switch may be controlled; means for driving said current adjusting means; and means responsive to the attainment of said preselected current flow through said biasing means for interrupting the drive to said current varying means to leave said biasing means in a desired state of bias.

9. A pin detector for a bowling pin containing a permanent magnet therein comprising: an indicating device for indicating the presence or absence of a bowling pin on a bowling alley pin spot; a reed type switch beneath said bowling alley pin spot and connected in a circuit with said indicating device; means for producing a bias on said reed switch so that said reed switch will be actuated at a preselected current flow through said biasing means and when a pin is present on said pin spot; means for adjusting the amount of current flowing through said biasing means to thereby vary the magnitude of the force of said biasing means whereby the sensitivity of said reed switch may be controlled; means for driving said current adjusting means; and means responsive to the attainment of said preselected current flow through said biasing means for interrupting the drive to said current varying means to leave said biasing means in a desired state of bias.

10. A pin detector for a bowling pin containing a permanent magnet therein comprising: an indicating device for indicating the presence or absence of a bowling pin on a bowling alley pin spot; a reed type switch beneath said bowling alley pin spot and connected in a circuit with said indicating device; means for producng a bias on said reed switch so that said reed switch will be actuated at a preselected current flow through said biasing means and when a pin is present on said pin spot; a current source for said biasing means; means for adjusting the magnitude of the force of said biasing means including, a variable resistor connected in circuit with said biasing means to vary the current flow through said biasing means; means for driving said variable resistor through its range of adjustment; and means responsive to attainment of said preselected current flow through said biasing means for interrupting the drive to said variable resistor, whereby the sensitivity of said reed switch may be controlled.

11. A pin detector for a bowling pin containing a permanent magnet therein comprising: an indicating device for indicating the presence or absence of a bowling pin on a bowling alley pin spot; a reed type switch beneath said bowling alley pin spot and connected in a circuit with said indicating device; means for producing a bias on said reed switch so that said reed switch will be actuated at a preselected current flow through said biasing means and when a pin is present on said pin spot; a current source for said biasing means; means for setting the reed switch to be actuated within a range of current flow through said biasing means; means for adjusting the magnitude of the force of said biasing means including, a variable resistor connected in circuit with said biasing means and having a range of adjustment for controlling said range of current flow through said biasing means; means for driving said variable resistor through its range of adjustment; and means responsive to attainment of said preselected current flow through said biasing means for interrupting the drive to said variable resistor, whereby the sensitivity of said reed switch may be controlled.

12. A pin detector for a bowling pin containing a permanent magnet therein comprising: an indicating device for indicating the presence or absence of a bowling pin on a bowling alley pin spot; a reed type switch beneath said bowling alley pin spot and connected in a circuit with said indicating device; means for producing a bias on said reed switch so that said reed switch will be actuated when a pin is present on said pin spot; a current source for said biasing means; means for setting the reed switch to be actuated within a range of current flow through said biasing means; a variable resistor connected in circuit with said biasing means and having a range of adjustment for controlling said range of current flow through said biasing means whereby the sensitivity of said reed switch may be controlled; means for driving said variable resistor through its range of adjustment; and means for interrupting the drive to said variable resistor in response to the actuating of said reed switch.

13. A pin detector for a bowling pin containing a permanent magnet therein comprising: an indicating device for indicating the presence or absence of a bowling pin on a bowling alley pin spot; a reed type switch beneath said bowling alley pin spot and connected in a circuit with said indicating device; means for producing a bias on said reed switch so that said reed switch will be actuated when a pin is present on said pin spot; a current source for said biasing means; means for setting the reed switch to be actuated within a range of current flow through said biasing means; a variable resistor connected in circuit with said biasing means and having a range of adjustment for controlling said range of current flow through said biasing means whereby the sensitivity of said reed switch may be controlled; a magnetic clutch for driving said variable resistor through its range of adjustment; a current source for energizing said magnetic clutch; and means for disconnecting said current source from said magnetic clutch in response to the actuation of said reed switch to stop the drive to said variable resistor and leave the reed switch in the desired state of sensitivity.

14. A calibration device comprising: biasing means; a current source for said biasing means, means controlled by said biasing means, and operatively responsive to a preselected current flow through said biasing means; a variable resistor connected in parallel with said biasing means, and adapted to control the amount of current flowing therethrough; means for driving said variable resistor through its range of adjustment; and means responsive to the attainment of said preselected current flow through said biasing means for interrupting the drive to said variable resistor to leave said biasing means in a desired state of bias.

15. The method of balancing bowling pin detection apparatus having a biased, magnetically actuated reed switch positioned beneath a pin spot connected in circuit with a pin indicator, and adapted to be operated by a bowling pin having a permanent magnet, comprising the steps of: (1) setting said reed switch to close within a range of current flow through said biasing means; (2) varying the current flow through said biasing means to close the reed switch; and (3) discontinuing the varying of said current flow in response to the closing of the reed switch to leave the reed switch in a predetermined state of sensitivity.

16. A calibration device comprising: biasing means; a current source for said biasing means; means controlled by said biasing means, and operatively responsive to a preselected current flow through said biasing means; means for varying the amount of current flowing through said biasing means; means for driving said current varying means; and means responsive to the attainment of said preselected current flow through said biasing means for interrupting the drive to said current varying means to leave said biasing means in a desired state of bias.

17. A calibrating device as set forth in claim 16 wheresaid current varying means is a variable resistor, and said driving means includes: a frame; an arm pivotally mounted on said frame; means for pivoting said arm; a first gear on said arm, and adapted to rotate during pivoting of said arm; a second gear meshing with said first gear and adapted to be rotated thereby; and releasable clutch means for coupling said variable resistor to said second gear.

18. A calibrating device as set forth in claim 17 wherein said driving means further includes a motor carried by said frame and having an output shaft; an output member on said shaft; and means on said output member mounted eccentrically with respect to said motor shaft for pivoting said arm.

19. A calibrating device as set forth in claim 18 wherein said drive means further includes a longitudinal groove in said arm, with said eccentrically mounted means being received in said groove for pivoting said arm.

20. A calibrating device as set forth in claim 17 wherein said driving means further includes: a motor carried by said frame and having an output shaft; an output member on said shaft; means on said output member mounted eccentrically with respect to said motor shaft for pivoting said arm in first direction during a portion of a revolution of said motor shaft, and in a second direction during the remainder of a revolution of the motor shaft; whereby said first gear rotates in a first direction when said arm pivots in said first direction and in a second direction when said arm pivots in said second direction, and said second gear is rotated by said first gear in a first direction when said arm pivots in said first direction and in a second direction when said arm pivots in said second direction.

21. A calibrating device as set forth in claim 20 including cooperating means on said second gear and said variable resistor for driving said variable resistor in one direction when said second gear rotates in said first direction.

22. A calibrating device as set forth in claim 17 wherein said variable resistor includes an operating shaft, and said releasable clutch means includes: a housing fixed on said shaft; a coil in said housing; a current source connected to said coil; means for disconnecting said current source from said coil; an armature rotatably mounted on said shaft and adapted to be attracted to said coil when said current source is connected to said coil; and means connecting said second gear and said armature for rotating said armature, whereby said housing and shaft will be rotated when said current source is connected to said coil, and said armature is rotated independently of said shaft when said current source is disconnected from said coil.

23. A calibrating device as set forth in claim 22 wherein said housing includes an abutment, and said armature is provided with an abutment engageable with said housing abutment when said armature is rotated in one direction relative to said housing, so that upon continued rotation of said armature in said one direction said housing and shaft will rotate together with said armature.

24. A calibrating device as set forth in claim 23 wherein said housing abutment is a pin extending radially outwardly of said housing, and said armature abutment is a pin extending axially adjacent the periphery of said armature.

References Cited

UNITED STATES PATENTS

| | | | |
|---|---|---|---|
| 2,424,146 | 7/1947 | Caldwell et al. | 324—130 X |
| 2,894,185 | 7/1959 | Chope et al. | 324—130 X |
| 2,194,146 | 3/1940 | Kaiserman | 273—46 |
| 2,966,561 | 12/1960 | Durant | 273—126 |
| 3,039,771 | 6/1962 | Bablouzian et al. | 273—54 |
| 3,223,414 | 12/1965 | Uecker | 273—52 |

ANTON O. OECHSLE, Primary Examiner

U.S. Cl. X.R.

74—70; 324—130; 340—280